United States Patent [19]

Matsubara et al.

[11] Patent Number: 4,680,154

[45] Date of Patent: Jul. 14, 1987

[54] METHOD OF MAKING CERAMIC ARTICLES

[75] Inventors: Saburo Matsubara, Yokohama; Shinichi Yagi, Kawasaki, both of Japan

[73] Assignee: Nippon Oil Co., Ltd., Japan

[21] Appl. No.: 719,344

[22] Filed: Apr. 3, 1985

[30] Foreign Application Priority Data

Apr. 14, 1984 [JP] Japan .................................. 59-73931

[51] Int. Cl.$^4$ .............................................. C04B 35/64
[52] U.S. Cl. ........................................ 264/63; 264/56
[58] Field of Search ..................................... 264/63, 56

[56] References Cited

U.S. PATENT DOCUMENTS 3,953,562  4/1976  Hait et al. ............................. 264/63

OTHER PUBLICATIONS

Brandrup et al, Polymer Handbook, Interscience Div., John Wiley and Sons, New York, N.Y., 1966, pp. 189–190.

*Primary Examiner*—James Derrington
*Attorney, Agent, or Firm*—McGlew and Tuttle

[57] ABSTRACT

Disclosed is a method of making ceramic articles which comprises the steps of shaping a composition for the manufacture of ceramics and firing the resulting shaped body, characterized in that the composition for the manufacture of ceramics contains (a) ceramic powder; (b) an organic binder comprising one or more member selected from the group consisting of homopolymers and copolymers derived from (1) bicyclo[2.2.1]heptene-2 and its derivatives, which are respresented by the formula

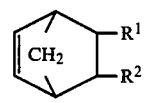
(I)

where $R^1$ is —H, —CH$_3$, —CO$_2$CH$_3$ or —OCOCH$_3$, $R^2$ is —H or —OCOCH$_3$, and $R^1$ is —OCOCH$_3$ when $R^2$ is —OCOCH$_3$, and (2) dicyclopentadiene; and (c) a plasticizer and/or (d) a hydrocarbon solvent. This method makes it possible to produce green sheets having excellent flexibility and high tensile strength, dry-pressed bodies having high green strength, and dense fired products.

6 Claims, No Drawings

METHOD OF MAKING CERAMIC ARTICLES

BACKGROUND OF THE INVENTION

1. Field of the Invention

This invention relates to a method of making ceramic articles by use of a novel composition for the manufacture of ceramics.

2. Description of the Prior Art

Ceramic articles made by firing powder materials such as alumina, ferrite, tungsten carbide, silicon nitride and silicon carbide have come to be used in a wide range of applications including electrical insulating materials, magnetic materials, electronic components, mechanical parts, automobile parts and cutting tools.

Conventionally, such ceramic articles are made by various methods including doctor blade coating, dry pressing, extrusion molding, slip casting and the like. Where a ceramic material such as alumina is used for example in the manufacture of integrated-circuit bases, alumina powder is dispersed in a solution containing an organic binder and a plasticizer to prepare a slurry. Then, using a doctor blade or similar instrument, this slurry is spread in a layer, for example, on a polyester film and dried. The sheet so formed is called a "green sheet". This sheet is rolled up and stored. Depending on need, pieces are cut out of the sheet with a punching die and then fired to decompose the organic binder and the plasticizer and, at the same time, sinter the alumina, thus producing ceramic bases. In this case, cellulosic resins such as ethyl cellulose and butyral resins such as polyvinyl butyral have conventionally been used as the organic binder. However, when these resins are used as such, the resulting green sheet has the disadvantage of exhibiting poor flexibility and, therefore, being easily broken or cracked while it is stored in roll form. Moreover, these resins are also disadvantageous in that their poor thermal decomposability tend to result in the presence of residual carbon in the final ceramic products.

On the other hand, the dry pressing process comprises dispersing ceramic powder in water containing an organic binder, a plasticizer, a dispersant and other agents to prepare a slurry, forming this slurry into granules by means of a spray dryer, and then shaping them by means of a compression molding machine, rubber pressing machine, hot pressing machine or similar machine. Alternatively, the aforesaid slurry can also be shaped by slip casting or extrusion molding. Then, the resulting shaped bodies are fired to produce a variety of ceramic articles.

If the unfired, shaped bodies have low green strength, they are often cracked or chipped during the succeeding binder removal and firing steps. Accordingly, the unfired, shaped bodies must have sufficiently high green strength in order to achieve a reduction in rejection rate and hence an improvement in productivity. On the other hand, in order to prevent the die from being damaged and to produce a dense shaped body containing few pores, it is necessary that the granules used as the starting material be easily collapsed and shaped under moderate pressure during the shaping step. To this end, it is desirable to use an organic binder having well-balanced performance characteristics. An additional property required for organic binders is good thermal decomposability. An organic binder having poor thermal decomposability requires high temperatures and long periods of time in the binder removal step. In some cases, residual carbon may remain in the final ceramic product, resulting in a significant reduction in electrical, magnetic, physical or mechanical properties.

Typical organic binders which have conventionally been used in such processes as dry pressing, extrusion molding and slip casting include water-soluble binders such as polyvinyl alcohol, alkali metal salts of carboxymethyl cellulose and alkali metal salts of acrylic resins. However, these binders have a number of disadvantages. Specifically, polyvinyl alcohol has been commonly used because of its low price, but it may gather mold during storage and may give off harmful gases and a bad odor, thereby bringing about an undesirable working environment. Moreover, the granules formed with polyvinyl alcohol are so hard that considerable damage is caused to the shaping die. In addition, since the granules are difficult to collapse, they produce shaped bodies which contain many pores and tend to become cracked and/or chipped. Furthermore, polyvinyl alcohol exhibits poor thermal decomposability during the firing step, so that the presence of much residual carbon prevents the production of dense ceramic articles. On the other hand, alkali metal salts of carboxymethyl cellulose give high viscosity even when used in low concentrations, and are difficult to handle because of their thixotropic properties. Moreover, like alkali metal salts of acrylic resins, they exhibit poor thermal decomposability. Thus, similar to polyvinyl alcohol they also fail to produce dense ceramic articles.

SUMMARY OF THE INVENTION

It is an object of the present invention to provide a method of making ceramic articles by use of an organic binder which can overcome the above-described disadvantages of conventional organic binders and which can produce green sheets having excellent flexibility and high tensile strength, block-like shaped bodies having high green strength when the composition is granulated and then shaped by dry pressing or a similar method, and eventually dense fired products.

According to the present invention, there is provided a method of making ceramic articles which comprises the steps of shaping a composition for the manufacture of ceramics and firing the resulting shaped body, characterized in that the composition for the manufacture of ceramics contains (a) 100 parts by weight of ceramic powder; (b) 0.2 to 20 parts by weight of an organic binder comprising one or more members selected from the group consisting of homopolymers and copolymers derived from (1) bicyclo[2.2.1]heptene-2 and its derivatives, which are represented by the formula

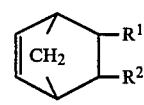
(I)

where $R^1$ is —H, —CH$_3$, —CO$_2$CH$_3$ or —OCOCH$_3$, $R^2$ is —H or —OCOCH$_3$, and $R^1$ is —OCOCH$_3$ when $R^2$ is —OCOCH$_3$, and (2) dicyclopentadiene; and 0.1 to 300 parts by weight of (c) a plasticizer and/or (d) a hydrocarbon solvent.

DETAILED DESCRIPTION OF THE PREFERRED EMBODIMENTS

The organic binder used in the present invention is a member, or a mixture of two or more members, selected from the group consisting of homopolymers and copolymers derived from bicyclo[2.2.1]heptene-2 and its derivatives, which are represented by the formula

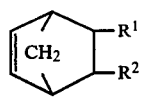 (I)

where $R^1$ is —H, —$CH_3$, —$CO_2CH_3$ or —$OCOCH_3$, $R^2$ is —H or —$OCOCH_3$, and $R^1$ is —$OCOCH_3$ when $R^2$ is —$OCOCH_3$, and (2) dicyclopentadiene. Typical examples of such homopolymers and copolymers include polybicyclo[2.2.1]heptene-2, poly-5-methylbicyclo[2.2.1]heptene-2 and polydicyclopentadiene, as well as copolymers derived from the corresponding monomers.

These homopolymers and copolymers can be prepared from the aforesaid monomers according to any of the well-known procedures. For example, they can be synthesized by subjecting the monomer or monomers to ring opening polymerization at a temperature of 10° to 120° C. in the presence of a polymerization catalyst system such as triethylaluminum-$TiCl_4$-tertiary amine, triethylaluminum-$MoCl_5$ or hydrated ruthenium chloride-alcohol.

These homopolymers and copolymers have a glass transition temperature of $-40°$ C. or above. Moreover, the infrared absorption spectra of these homopolymers have absorption bands at 965 cm$^{-1}$ and 735 cm$^{-1}$, indicating the presence of the trans- and cis-double bonds, respectively.

The plasticizers which can be used in the present invention include, for example, paraffinic, aromatic and nephthenic process oils; esters such as phthalic esters, sebacic esters and adipic esters; chlorinated paraffins; diarylalkanes, triarylalkanes tetraarylalkanes; alkylnaphthalenes such as mono-, di- and triisopropylnaphthalene; alkylbiphenyl such as diethyldiphenyl and triethyldiphenyl; and mixtures of the foregoing. The aforesaid diarylalkanes, triarylalkanes and tetraarylalkanes are compounds having 2 to 4 aromatic rings or mixtures of such compounds. These compounds are obtained by reacting one or more benzene derivatives such as styrene, toluene and xylene in the presence of a liquid or solid acid catalyst such as a Lewis acid (e.g., sulfuric acid or phosphoric acid, a cation exchange resin, or a Friedel-Crafts catalyst such as aluminum chloride, boron fluoride. Examples of these compounds are those having the chemical structures represented by the following formulas:

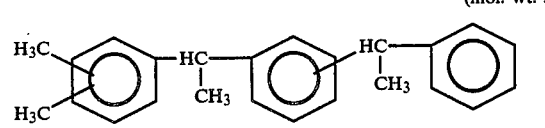 (mol. wt. 314)

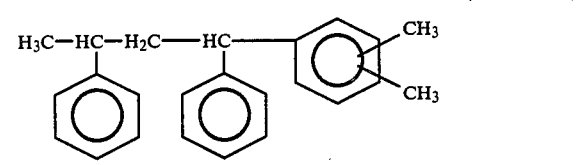 (mol. wt. 314)

-continued

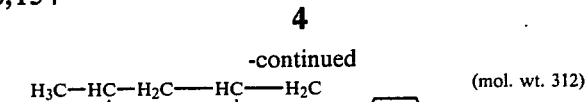 (mol. wt. 312)

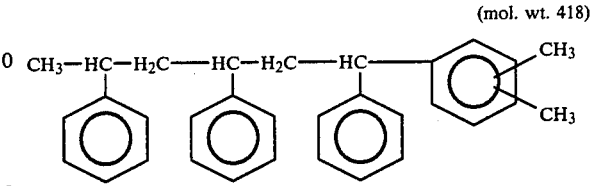 (mol. wt. 418)

Among others, diarylalkanes, triarylalkanes and tetraarylalkalnes; alkylnaphthalenes such as mono-, di- and triisopropylnephthalene; alkylbiphenyls such as diethyldiphenyl and triethyldiphenyl; and mixtures of the foregoing are preferably used.

The hydrocarbon solvents which can be used in the present invention include, for example, lower aliphatic alcohols such as ethanol, propanol and butanol; ketones such as acetone, isobutyl methyl ketone; organic esters such as ethyl acetate; halogenated hydrocarbons such as trichlene; aromatic hydrocarbons such as benzene, toluene and xylene; petroleum fractions such as mineral spirit, kerosine, gas oil and white oil; and mixtures of the foregoing.

The ceramic powder used in the present invention can be any inorganic material that is in the form of a sinterable powder having an average particle diameter of the order of 0.1 to 10 $\mu$m. Examples thereof include oxides such as alumina, silica, magnesia, zirconia, beryllia, thoria, urania, titania and ferrite; carbides such as silicon carbide, titanium carbide, tungsten carbide, boron carbide and zirconium carbide; and titanates such as barium titanate, magnesium titanate, calcium titanate and strontium titanate.

These materials may be used alone or in admixture of two or more.

In addition, one or more powders selected from the group consisting of powdered metals such as iron, copper, aluminum, silicon, nickel, cobalt, alloys of these metals and stainless steel and carbon powder may be added to the aforesaid ceramic powder, if desired.

In the practice of the present invention, the composition for the manufacture of ceramics can be prepared by using the components in any desired amounts selected from their respective wide ranges. Specifically, for 100 parts by weight of the ceramic powder, the organic binder can be used in an amount of 0.2 to 20 parts by weight and preferably 0.3 to 15 parts by weight, and the plasticizer and/or solvent can be used in an amount of 0.1 to 300 parts by weight and preferably 0.2 to 200 parts by weight.

The particular amounts of these components are suitably selected according to the method for shaping the composition. For example, where flexible bodies such as green sheets are desired, it is preferable to use a composition comprising 100 parts by weight of the ceramic powder, 0.5 to 5.0 parts by weight of the organic binder, 1.5 to 30 parts by weight of the plasticizer and 30 to 200 parts by weight of the solvent.

In this case, if the amount of organic binder used is less than 0.5 part by weight, satisfactory green sheets cannot be obtained because of reduced tensile strength and poor flexibility. If the amount of organic binder used is greater than 5.0 parts by weight, it is difficult to form the resulting slurry into a sheet because of its unduly high viscosity and the binder removal step requires a long period of time. If the amount of plasticizer used is less than 1.5 parts by weight, the resulting green sheet will have poor flexibility, and if it is greater than 30 parts by weight, the resulting green sheet will have such reduced tensile strength that it cannot be peeled from the polyester film.

On the other hand, if the amount of solvent used is less than 30 parts by weight, the resulting slurry will have such high viscosity that the organic binder of the present invention cannot be uniformly dispersed in the ceramic powder. If the amount of solvent used is greater than 200 parts by weight, the resulting slurry will have such low viscosity that it flows away when spread on a polyester film and, therefore, the thickness of the green sheet will be difficult to control.

For purposes of extrusion molding or dry pressing, there can be used a composition comprising 100 parts by weight of the ceramic powder, 0.5 to 10 parts by weight of the organic binder, 0.5 to 10 parts by weight of the plasticizer and 20 to 200 parts by weight of the solvent. Such a composition may be directly shaped by extrusion molding, or may be formed into granules by means of for example a spray dryer and then shaped by dry pressing.

In this case, if the amount of organic binder used is less than 0.5 part by weight, the resulting shaped body will have reduced green strength and will tend to be chipped or cracked, and if it is greater than 10 parts by weight, the binder removal step during the firing process will require a long period of time. If the amount of plasticizer used is less than 0.5 part by weight, the composition will be difficult to granulate and the resulting granules will be so hard that they will be difficult to collapse and will tend to give a shaped body containing many pores. If the amount of plasticizer used is greater than 10 parts by weight, the resulting shaped body will again have reduced green strength.

If the amount of solvent used is less than 20 parts by weight, the resulting slurry will have such high viscosity that the ceramic powder, the organic binder and the plasticizer cannot be mixed uniformly. If the amount of solvent used is greater than 200 parts by weight, the solvent removal step will require a long period of time.

For purposes of injection molding, there can be used a composition comprising 100 parts by weight of the ceramic powder, 0.5 to 20 parts by weight of the organic binder and 0.2 to 100 parts by weight of the plasticizer.

If the amount of organic binder used is less than 0.5 part by weight, the resulting shaped body will have reduced green strength and, therefore, will tend to be chipped or cracked, and if it is greater than 20 parts by weight, the binder removal step will require a long period of time, as described above. If the amount of plasticizer used is less than 0.2 part by weight, the resulting composition will have such poor flow properties that it is incapable of injection molding, and if it is greater than 100 parts by weight, the resulting shaped body will again have reduced green strength.

The above-described compositions for the manufacture of ceramics can be prepared according to any conventional procedure. For example, the organic binder and the plasticizer may be dissolved in the solvent. Then, using a ball mill, this solution may be blended with the ceramic powder for a period of about 24 to 48 hours to obtain a composition for the manufacture of ceramics in the form of a slurry. This slurry may be spread on a polyester film and dried to produce a green sheet. Alternatively, this slurry-like composition for the manufacture of ceramics may also be form in a plaster mold to produce a shaped body by slip casting. Alternatively, a composition for the manufacture of ceramics may be prepared by blending the ceramic powder and the organic binder solution in a mixing machine such as a kneader. Then, this composition may be shaped by means of an extruding machine or an injection molding machine to obtain a desired shaped body.

In these compositions for the manufacture of ceramics, plastics (such as polyethylene, polypropylene and polystyrene), waxes (such as paraffin wax and atactic polypropylene), rosin, terpene resins, aliphatic or aromatic pertoleium resins and their hydrogenation products, lubricants, deflocculants, dispersants, parting agents and antioxidants may suitably be used in addition to the ceramic powder material, the organic binder and the plasticizer and/or solvent. Furthermore, minor amounts of conventional organic binders may be used in combination with the organic binder of the present invention.

The organic binder can also be used in the form of an aqueous emulsion which is prepared by adding a surfactant and water to a solution containing the organic binder. Any conventional procedure may be used to fire the shaped bodies made of the above-described ceramic compositions and thereby produce ceramic articles in accordance with the present invention. For example, this can be accomplished by heating the shaped bodies to the sintering temperature in an oxidizing atmosphere, an inert gas atmosphere or a reducing atmosphere.

The ceramic articles made by the method of the present invention are used as earthenware, refractories, grindstones, graphite electrodes, ignition plugs, honeycomb carriers, optical communication fibers, ceramic condensers, thermistors, magnetic head ferrite, magnetic core materials, gas sensors, temperature sensors, varistors, piezo-oscillators, integrated-circuit bases and packages, electrical insulating materials and nuclear reactor materials.

The green sheets which are formed as intermediate products according to the method of the present invention have excellent flexibility and sufficiently high tensile strength. Since this performance is achieved by using a smaller amount of the organic binder as compared with polymeric compounds such as polyvinyl butyral which have conventionally been proposed as organic binders, the method of the present invention is very advantageous in consideration of the necessity for removing the organic binder during the firing step.

Moreover, the method of the present invention is also advantageous in that dense block-like shaped bodies having high green strength can be produced when the shaping step is carried out by dry pressing. Furthermore, there can be finally obtained dense ceramic articles containing little residual carbon.

The present invention is further illustrated by the following examples:

EXAMPLE 1

Into a one-liter flask fitted with a stirrer and a condenser were charged 300 g of bicyclo[2.2.1]heptene-2 and 300 ml of n-butanol. After a catalyst comprising 0.2 g of hydrated ruthenium chloride dissolved in 100 ml of n-butanol was added thereto, the reaction mixture was heated at 95° C. for 8 hours in a nitrogen atmosphere. The resulting reaction product was pulverized, washed with methanol and then dried to obtain a polymer in the form of a white powder. On the basis of the infrared absorption spectrum of the double-bond units formed by ring opening, this polymer was found to contain the trans form (965 cm$^{-1}$) and the cis form (735 cm$^{-1}$) in the approximate ratio of 2:1. This polymer had a glass transition temperature of 35° C. and a softening temperature of 180° C. or above (as determined by the ring and ball method).

Then, this polymer was pressed at about 220° C. to form a sheet 3 mm thick when determined according to the ASTM-D procedure, the hardness value of this sheet (hereinafter referred to as sample A-1) was found to be 70.

Xylene and styrene were reacted in the presence of a sulfuric acid catalyst and the resulting reaction product was precisely distilled to obtain a liquid hydrocarbon compound having an average molecular weight of 314 and a viscosity of 8,000 centipoises at 20° C. (hereinafter referred to as sample B-1). To 100 g of alumina having an average particle diameter of 3 μm was added a solution containing 2.0 g of sample A-1 and 6.0 g of sample B-1 in 70 g of toluene. These ingredients were blended in a ball mill for 24 hours and defoamed at a reduced pressured of 20 mmHg for an hour to obtain a ceramic composition.

This ceramic composition was spread on a silicone-treated polyester film and dried to obtain a green sheet having a thickness of about 0.5 mm and exhibiting a good surface condition. The flexibility and tensile strength of this green sheet were determined according to the testing procedures given below and the results thus obtained are shown in Table 1.

(1) Flexibility test

Specimens having a length of 80 mm and a width of 10 mm were prepared from the above green sheet and tested by means of a bending tester. Specifically, each specimen was quickly (i.e., in about one second) bent through 180° over an iron mandrel having a diameter of 2, 4, 6, 8 or 10 mm. Thus, the minimum diameter (mm) of the iron mandrel at which the specimen was neither broken nor cracked was determined. Smaller values indicate higher degrees of flexibility.

(2) Tensile strength

A dumbbell specimen was cut out of the above green sheet with a JIS No. 2 dumbbell die and its tensile strength (g/mm$^2$) was measured with a Tensilon tensile tester (manufactured by Toyo Seiki K.K.) at a pulling rate of 50 mm/m.

Then, in an oxidizing atmosphere, the above green sheet was heated to 400° C. at a rate of 200° C./hr and held at that temperature for 4 hours to remove the binder. Thereafter, it was heated to 1,650° C., held at that temperature for 2 hours and then cooled to room temperature at a rate of 200° C./hr to obtain a final product exhibiting good surface smoothness and having a fired density of 3.90 g/cc.

EXAMPLE 2

A composition for the manufacture of ceramics was prepared in the same manner as described in Example 1, except that alumina having an average particle diameter of 2 μm was used as the ceramic powder material. Then, this composition was form into a green sheet. The results of evaluation of this green sheet are shown in Table 1.

The above green sheet was fired in the same manner as described in Example 1. Thus, there was obtained a dense final product exhibiting good surface smoothness and having a fired density of 3.92 g/cc.

EXAMPLE 3

The synthesis of a polymer was carried out in the same manner as described in Example 1 except that a mixture of 150 g of bicyclo[2.2.1]heptene-2 and 150 g of 5-methylbicyclo[2.2.1]heptene-2 was used as the monomer. Thus, there was obtained a polymer in the form of a white powder. This polymer also had a glass transition temperature of 35° C. and a softening temperature of 180° C. or above. The polymer was formed into a sheet (hereinafter referred to as sample A-2) having a hardness value of 68. Using sample A-2 in place of sample A-1, the procedure of Example 1 was repeated to obtain a green sheet exhibiting a good surface condition. The results of evaluation of this green sheet are shown in Table 1. This green sheet was fired in the same manner as described in Example 1 to obtain a dense final product exhibiting good surface smoothness and having a fired density of 3.90 g/cc.

EXAMPLE 4

Into a one-liter flask fitted with a stirrer and a condenser were charged 200 g of dicyclopentadiene and 300 ml of toluene. Then, 30 mmoles of triethylaluminum, 90 mmoles of triethylamine and 1.5 mmoles of titanium tetrachloride were added thereto as catalysts in that order. The resulting reaction mixture was allowed to stand at 25° C. for 20 hours and then worked up in the same manner as described in Example 1 to obtain a polymer in the form of a white powder. This polymer also had a glass transition temperature of 35° C. and a softening temperature of 180° C. or above. The polymer was formed into a sheet (hereinafter referred to as sample A-3) having a hardness value of 66. Using sample A-3 in place of sample A-1, the procedure of Example 1 was repeated to obtain a green sheet exhibiting a good surface condition. The results of evaluation of this green sheet are shown in Table 1. This green sheet was fired in the same manner as described in Example 1 to obtain a dense final product exhibiting good surface smoothness and a fired density of 3.86 g/cc.

COMPARATIVE EXAMPLE 1

In the same manner as described in Example 1, a composition for the manufacture of ceramics was prepared by adding 4.0 g of polyvinyl butyral, 4.0 g of DBP and 70 g of toluene to 100 g of alumina having an average particle diameter of 3 μm. Then, this composition was formed into a green sheet. The results of evaluation of this green sheet are shown in Table 1.

The above green sheet was fired in the same manner as described in Example 1. Thus, there was obtained a final product having a fired density of 3.82 g/cc.

TABLE 1

|  | Properties of green sheet | | Surface condition of green sheet |
|---|---|---|---|
|  | Flexibility mm (rating) | Tensile strength, g/cm$^2$ (rating) |  |
| Example 1 | 2 (O) | 80 (O) | Glossy and good |
| Example 2 | 2 (O) | 81 (O) | Good |

TABLE 1-continued

|  | Properties of green sheet | | Surface condition of green sheet |
|---|---|---|---|
|  | Flexibility mm (rating) | Tensile strength, g/cm² (rating) |  |
| Example 3 | 2 (O) | 78 (O) | Glossy and good |
| Example 4 | 2 (O) | 73 (O) | Glossy and good |
| Comparative Example 1 | 6 (X) | 100 (O) | Good |

EXAMPLE 5

The ceramic powder used was prepared as follows: A mixture of 51 mole % of $Fe_2O_3$, 24 mole % of MnO and 25 mole % of ZnO was blended in a ball mill for 10 hours, dried, calcined at 850° C. for 3 hours, and then ground in a ball mill for 15 hours.

To 100 g of this ceramic powder was added a solution containing 1.0 g of sample A-1 and 5.0 g of sample B-1 in 10 g of toluene. These ingredients were blended in a grinding mill and the resulting blend was formed into granules, which were allowed to stand at room temperature for 24 hours and then completely dried at 100° C. for 2 hours. A sample of these granules was placed in a die and pressed under a pressure of 1.0 ton/cm² to obtain a shaped body having a green density of 3.12 g/cc. When the surface of the shaped body was observed under a microscope, it was found to be dense and in a good condition. Moreover, when the compression fracture strength of this shaped body was measured, the measured value of 31.5 kg/cm revealed its good green strength. Then, the shaped body was placed in a furnace and fired at 1,350° C. for 4 hours in an atmosphere of nitrogen gas containing 0.1% of oxygen. As a result, no occurrence of cracking or chipping was observed during the firing step and there was obtained a dense final product having a fired density of 4.80 g/cc.

COMPARATIVE EXAMPLE 2

The procedure of Example 5 was repeated except that a 10% aqueous solution of polyvinyl alcohol (with a degree of saponification of 87-89 mole % and commercially available from Denki Kagaku Kogyo K.K. under the trade name of Denkapoval B-05) was used as the organic binder. Thus, there was obtained a shaped body having a green density of 3.04 g/cc and a compression fracture strength of 29 kg/cm². When the surface of the shaped body was observed under a microscope, it was found to contain many pores because the granules were difficult to collapse. The final product obtained in the same manner as described in Example 5 had a fired density of as low as 4.68 g/cc.

What is claimed is:

1. A method of making ceramic articles which comprises the steps of shaping a composition for the manufacture of ceramics and firing the resulting shaped green body, characterized in that the composition for the manufacture of ceramics contains (a) 100 parts by weight of ceramic powder; (b) 0.2 to 20 parts by weight of an organic binder comprising one or more members selected from the group consisting of ring-opening homopolymers and copolymers derived from (1) bycyclo[2.2.1]heptene-2 and its derivatives, which are represented by the formula

where $R^1$ is —H, —$CH_3$, —$CO_2CH_3$ or —$OCOCH_3$, $R^2$ is —H or —$OCOCH_3$, and R is —$OCOCH_3$ when $R^2$ is —$OCOCH_3$, and (2) dicyclopentadiene; and 0.1 to 300 parts by weight of (c) a plasticizer and/or (d) a hydrocarbon solvent.

2. A method as claimed in claim 1 wherein the plasticizer comprises one or more members selected from the group consisting of diarylalkanes, triarylalkanes, tetraarylalkanes, alkylnaphthalenes and alkylbiphenyls.

3. A method as claimed in claim 1 wherein the hydrocarbon solvent comprises one or more members selected from the group consisting of lower aliphatic alcohols, ketones, organic esters, halogenated hydrocarbons, aromatic hydrocarbons, mineral spirit, kerosine, gas oil and white oil.

4. A method as claimed in claim 1 wherein the composition contains (a) 100 parts by weight of the ceramic powder, (b) 0.5 to 5 parts by weight of the organic binder, (c) 1.5 to 30 parts by weight of the plasticizer and (d) 30 to 200 parts by weight of the hydrocarbon solvent, which method includes the step of forming the composition into a green sheet.

5. A method as claimed in claim 1 wherein the composition contains (a) 100 parts by weight of the ceramic powder, (b) 0.5 to 10 parts by weight of the organic binder, (c) 0.5 to 10 parts by weight of the plasticizer and (d) 20 to 200 parts by weight of the hydrocarbon solvent, which method includes the step of shaping the composition directly by extrusion molding or the steps of forming it into granules and then shaping the granules by dry pressing.

6. A method as claimed in claim 1 wherein the composition contains (a) 100 parts by weight of the ceramic powder, (b) 0.5 to 20 parts by weight of the organic binder, and (c) 0.2 to 100 parts by weight of the plasticizer, which method includes the step of shaping the composition by injection molding.

* * * * *